(12) United States Patent  
Su et al.

(10) Patent No.: US 8,799,970 B2  
(45) Date of Patent: Aug. 5, 2014

(54) MEDIA STREAM PLAYING METHOD AND SET-TOP BOX

(75) Inventors: Yongbin Su, Shenzhen (CN); Fei Wang, Wuhan (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/611,332

(22) Filed: Sep. 12, 2012

(65) Prior Publication Data

US 2013/0247127 A1 Sep. 19, 2013

(30) Foreign Application Priority Data

Feb. 22, 2012 (CN) .......................... 2012 1 0040483

(51) Int. Cl.
*H04N 7/173* (2011.01)
(52) U.S. Cl.
USPC ................................. 725/93; 725/94; 725/95
(58) Field of Classification Search
USPC ........................................ 725/39, 93–95, 131
See application file for complete search history.

(56) References Cited

U.S. PATENT DOCUMENTS

| 2002/0024616 | A1 | 2/2002 | Kim |
| 2003/0106065 | A1* | 6/2003 | Sakai et al. ..................... 725/91 |
| 2005/0289614 | A1 | 12/2005 | Baek et al. |

FOREIGN PATENT DOCUMENTS

| CN | 101374210 A | 2/2009 |
| CN | 101415082 A | 4/2009 |
| CN | 102123319 A | 7/2011 |

OTHER PUBLICATIONS

Extended European Search Report issued in corresponding European Patent Application No. 12184010.2, mailed Nov. 30, 2012.
International Search Report issued in corresponding PCT Patent Application No. PCT/CN2012/080128, mailed Dec. 6, 2012.

* cited by examiner

*Primary Examiner* — Hunter B Lonsberry
(74) *Attorney, Agent, or Firm* — Brinks Gilson & Lione

(57) ABSTRACT

The present invention provides a media stream playing method and a set-top box. In the present invention, in a process that a guidance unit of a set-top box initializes a platform system, the guidance unit obtains a channel identifier of a channel to be played and obtains, by using the channel identifier, a media stream that corresponds to the channel identifier, so that the guidance unit can send the media stream to a playing unit of the set-top box for playing. Because the technical solution is independent of the platform system of the set-top box, a problem in the prior art that, the set-top box cannot perform a television play service in an initialization process of the set-top box and the set-top box can perform the television play service by using the platform system only after the initialization of the set-top box is completed, can be avoided.

11 Claims, 1 Drawing Sheet

MEDIA STREAM PLAYING METHOD AND SET-TOP BOX

CROSS-REFERENCE TO RELATED APPLICATIONS

This application claims priority to Chinese Patent Application No. 201210040483.9, filed on Feb. 22, 2012, which is hereby incorporated by reference in its entirety.

FIELD OF THE INVENTION

The present invention relates to streaming media technologies, and in particular, to a media stream playing method and a set-top box.

BACKGROUND OF THE INVENTION

Television play services, for example, a cable television service and an Internet protocol television (Internet Protocol Television, IPTV for short) service, have become important services for enabling telecommunication operators to be transformed to comprehensive information service providers. As a display terminal of a television play service, a set-top box is an important constituent part of a television play service solution. Because the set-top box needs to support more and more applications, so that a platform system of the set-top box becomes more and more complex, time spent in an initialization (including initialization of an operating system, initialization of middle software, and loading of platform application software) process of the platform system of the set-top box becomes longer and longer.

However, a television play service cannot be performed by the set-top box in the initialization process of the set-top box, and the set-top box can perform the television play service by using the platform system only after the initialization of the set-top box is completed, thereby causing reduction of playing efficiency of the set-top box.

SUMMARY OF THE INVENTION

The present invention provides a media stream playing method and a set-top box, so as to improve playing efficiency of the set-top box.

In one aspect, a media stream playing method is provided, and includes:

in a process that a guidance unit of a set-top box initializes a platform system, obtaining, by the guidance unit, a channel identifier of a channel to be played, and obtaining, by using the channel identifier, a media stream that corresponds to the channel identifier; and sending, by the guidance unit, the media stream to a playing unit of the set-top box for playing.

In another aspect, a set-top box is provided, and includes a guidance unit and a playing unit, where the guidance unit is configured to initialize a platform system, and further configured to: obtain, in a process of initializing the platform system, a channel identifier of a channel to be played, obtain, by using the channel identifier, a media stream that corresponds to the channel identifier, and send the media stream to the playing unit; and the playing unit is configured to receive the media stream sent by the guidance unit and play the media stream.

It can be known from the foregoing technical solutions that, in the embodiments of the present invention, in the process that the guidance unit of the set-top box initializes the platform system, the guidance unit obtains the channel identifier of the channel to be played and obtains, by using the channel identifier, the media stream that corresponds to the channel identifier, so that the guidance unit can send the media stream to the playing unit of the set-top box for playing. Because the technical solutions are independent of the platform system of the set-top box, a problem in the prior art that, the set-top box cannot perform a television play service in an initialization process of the set-top box and the set-top box can perform the television play service by using the platform system only after the initialization of the set-top box is completed, can be avoided, thereby improving playing efficiency of the set-top box.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are merely some embodiments of the present invention, and persons of ordinary skill in the art may further obtain other drawings according to these accompanying drawings without creative efforts.

DETAILED DESCRIPTION OF THE EMBODIMENTS

In order to make the objectives, technical solutions, and advantages of the present invention clearer, the technical solutions in the embodiments of the present invention are clearly and completely described in the following with reference to the accompanying drawings in the embodiments of the present invention. Apparently, the embodiments in the following description are merely a part rather than all of the embodiments of the present invention. Based on the embodiments of the present invention, all other embodiments obtained by persons of ordinary skill in the art without creative efforts shall fall within the protection scope of the present invention.

Figure 1:
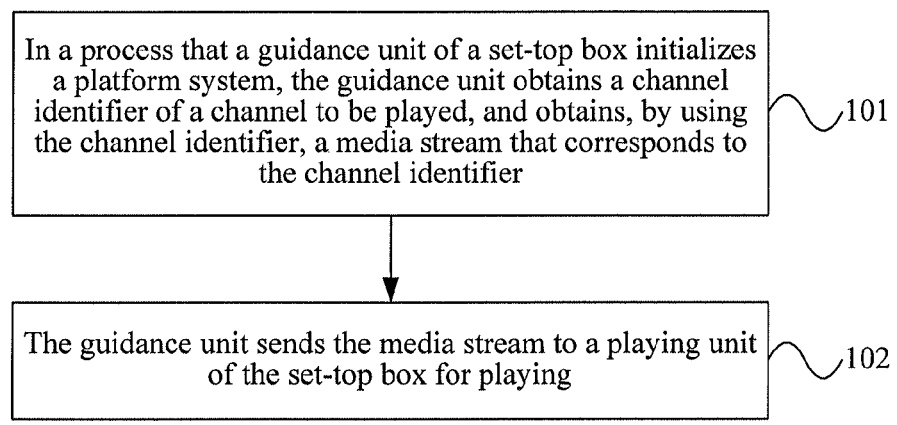
FIG. 1 is a schematic flow chart of a media stream playing method according to an embodiment of the present invention.

FIG. 1 is a schematic flow chart of a media stream playing method according to an embodiment of the present invention. As shown in FIG. 1, the media stream playing method in this embodiment may include:

101: In a process that a guidance unit of a set-top box initializes a platform system, the guidance unit obtains a channel identifier of a channel to be played, and obtains, by using the channel identifier, a media stream that corresponds to the channel identifier.

In the process that the guidance unit of the set-top box initializes the platform system, steps in the present invention may be executed at the same time when the guidance unit starts to initialize the platform system, and the steps in the present invention may also start to be executed at a specific time point after the guidance unit starts to initialize the platform system, which is not limited in the present invention.

It should be noted that, in the set-top box involved in the present invention, from power-on to start-up of the platform system, the guidance unit needs to initialize the platform system; the guidance unit may initialize a hardware device, and establish a mapping table of a memory space, and so on, thereby establishing a proper system software/hardware environment and making preparation to finally invoke a kernel of the platform system by the set-top box to perform a television play service. A playing unit is configured to perform a television play service according to a received media stream or other signals.

In an optional implementation manner of this embodiment of the present invention, a signal of the foregoing channel to be played may be an encrypted signal.

Preferably, in an optional implementation manner of this embodiment of the present invention, a signal of the foregoing channel to be played may also be an unencrypted signal, so that an operation is simpler and playing efficiency of the set-top box can further be improved. Specifically, before a channel identifier of a channel to be played is obtained, the guidance unit may select a channel to be played and take only a channel on which a media stream is an unencrypted signal as the channel to be played.

In an optional implementation manner of this embodiment of the present invention, the guidance unit may specifically obtain a channel identifier of a channel, which is lately played by the playing unit before current initialization of the set-top box, as the channel identifier of the channel to be played.

In another optional implementation manner of this embodiment of the present invention, the guidance unit may specifically obtain a channel list and send the channel list to the playing unit for playing, and further obtain a channel identifier, which is selected by a user according to the channel list, as the channel identifier of the channel to be played.

It may be understood that the channel list may be a channel list that is generated by the set-top box according to an electronic program guide (Electronic Program Guide, EPG for short) before last power-off, and the channel list includes channel identifiers of some pre-assigned channels to be played and corresponding simple operation options that are executed without depending on a platform system (that is, a platform system that completes initialization), for example, play, stop, and so on.

It may be understood that, for details of describing that the guidance unit obtains, by using the channel identifier, the media stream that corresponds to the channel identifier, reference may be made to related content in the prior art, which are not described here again.

102: The guidance unit sends the media stream to the playing unit of the set-top box for playing.

In an optional implementation manner of this embodiment of the present invention, before 102, the guidance unit may further initialize the playing unit and complete the initialization of the playing unit. Further, in this embodiment, after the guidance unit completes the initialization of the platform system, the playing unit may stop obtaining the media stream from the guidance unit and performing a play service, but perform a television play service through the platform system, and specifically, may play, according to information such as an instruction or a media stream obtained from the platform system, a corresponding media stream, that is, a television play service such as a live telecast and an on-demand service.

In this embodiment, in the process that the guidance unit of the set-top box initializes the platform system, the guidance unit obtains the channel identifier of the channel to be played and obtains, by using the channel identifier, the media stream that corresponds to the channel identifier, so that the guidance unit can send the media stream to the playing unit of the set-top box for playing. Because the technical solution is independent of the platform system of the set-top box, that is, does not depend on the operation of the platform system, a problem in the prior art that, the set-top box cannot perform a television play service in an initialization process of the set-top box and the set-top box can perform, by using an application software platform system that runs on the platform system, the television play service only after the initialization of the set-top box is completed, can be avoided, thereby improving playing efficiency of the set-top box.

It should be noted that, for brevity, the foregoing method embodiments are represented as a series of actions. However, persons skilled in the art should know that the present invention is not limited to the order of the described actions, because according to the present invention, some steps may adopt other order or may be performed simultaneously. Next, persons skilled in the art should also know that the embodiments described in this specification are all exemplary embodiments, and the involved actions and units are not necessarily required in the present invention.

In the foregoing embodiments, the description of each embodiment has its emphasis, and for a part that is not described in detail in a certain embodiment, reference may be made to the relevant description of other embodiments.

Figure 2:
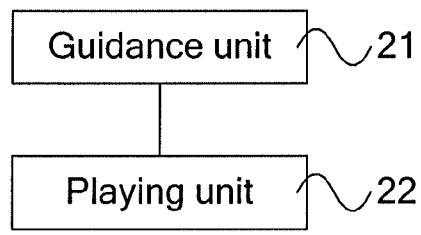
FIG. 2 is a schematic structural diagram of a set-top box according to another embodiment of the present invention.

FIG. 2 is a schematic structural diagram of a set-top box according to another embodiment of the present invention. As shown in FIG. 2, the set-top box in this embodiment may include a guidance unit 21 and a playing unit 22. The guidance unit 21 is configured to initialize a platform system, and further configured to obtain, in a process of initializing the platform system, a channel identifier of a channel to be played, obtain, by using the channel identifier, a media stream that corresponds to the channel identifier, and send the media stream to the playing unit. The playing unit 22 is configured to receive the media stream sent by the guidance unit and play the media stream. In the process that the guidance unit initializes the platform system, steps in the present invention may be executed at the same time when the guidance unit starts to initialize the platform system, and the steps in the present invention may also start to be executed at a specific time point after the guidance unit starts to initialize the platform system, which is not limited in the present invention.

In an optional implementation manner of this embodiment of the present invention, a signal of the foregoing channel to be played may be an encrypted signal.

Preferably, in an optional implementation manner of this embodiment of the present invention, a signal of the foregoing channel to be played may also be an unencrypted signal, so that an operation is simpler and playing efficiency of the set-top box can further be improved. Specifically, before a channel identifier of a channel to be played is obtained, the guidance unit may select a channel to be played and take only a channel on which a media stream is an unencrypted signal as the channel to be played.

In an optional implementation manner of this embodiment of the present invention, the guidance unit 21 may specifically obtain a channel identifier of a channel, which is lately played by the playing unit before current initialization of the set-top box, as the channel identifier of the channel to be played.

In an optional implementation manner of this embodiment of the present invention, the guidance unit 21 may specifically obtain a channel list and send the channel list to the playing unit 22 for playing the channel list to a user, and further obtain a channel identifier, which is selected according to the channel list by a user that uses the set-top box, as the channel identifier of the channel to be played.

In an optional implementation manner of this embodiment of the present invention, the guidance unit 21 may further initialize the playing unit 22 and complete the initialization of the playing unit 22.

Further, in an optional implementation manner of this embodiment of the present invention, after the guidance unit 21 completes the initialization of the platform system, the playing unit 22 may further stop obtaining the media stream from the guidance unit 21, but perform a television play service through the platform system to play a corresponding media stream, that is, a television play service such as a live telecast and an on-demand service.

In this embodiment, with the set-top box, in the process that the guidance unit initializes the platform system, the guidance unit obtains the channel identifier of the channel to be played and obtains, by using the channel identifier, the media stream that corresponds to the channel identifier, so that the guidance unit can send the media stream to the playing unit of the set-top box for playing. Because the technical solution is independent of the platform system of the set-top box, that is, does not depend on the operation of the platform system, a problem in the prior art that, the set-top box cannot perform a television play service in an initialization process of the set-top box and the set-top box can perform the television play service by using the platform system only after the initialization of the set-top box is completed, can be avoided, thereby improving playing efficiency of the set-top box.

Persons skilled in the art may clearly understand that for convenience and brevity of description, for a specific working process of the system, the apparatus, and the unit described in the foregoing, reference may be made to a corresponding process in the foregoing method embodiment, which is not described here again.

In several embodiments provided in this application, it should be understood that the disclosed system, apparatus, and method may be implemented in another way. For example, the described apparatus embodiment is merely exemplary. For example, the unit division is merely a logical function division and may be another division in actual implementation. For example, multiple units or components may be combined or integrated into another system, or some features may be ignored or not be performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on multiple network elements. A part or all of the units may be selected according to an actual demand to achieve the objectives of the solutions in the embodiments.

In addition, function units in the embodiments of the present invention may be integrated into one processing unit, or each of the units may exist alone physically, or two or more units are integrated into one unit. The integrated unit may be implemented through hardware, or may also be implemented in the form of hardware plus a software functional unit.

The integrated unit implemented in the form of a software functional unit may be stored in a computer readable storage medium. The software functional unit is stored in a storage medium, and includes several instructions used to instruct a computer device (may be a personal computer, a server, or a network device, and so on) to perform parts of steps of the methods according to the embodiments of the present invention. The storage medium may be any medium that can store program codes such as a USB flash disk, a removable hard disk, a read-only memory (Read-Only memory, ROM for short), a random access memory (Random Access Memory, RAM for short), a magnetic disk, or an optical disk.

Finally, it should be noted that the foregoing embodiments are merely provided for describing the technical solutions of the present invention, but are not intended to limit the present invention. It should be understood by persons of ordinary skill in the art that although the present invention has been described in detail with reference to the embodiments, modifications may still be made to the technical solutions described in the embodiments, or equivalent replacements may be made to some technical features in the technical solutions, as long as such modifications or replacements do not cause the essence of corresponding technical solutions to depart from the spirit and scope of the technical solutions in the embodiments of the present invention.

What is claimed is:

1. A media stream playing method implemented in a set-top box comprising a guidance unit and a playing unit, comprising:
   in a process that the guidance unit initializes a platform system of the set-top box, obtaining, by the guidance unit, a channel identifier of a channel to be played, and obtaining, by using the channel identifier, a media stream that corresponds to the channel identifier; and
   sending, by the guidance unit, the media stream to the playing unit for playing;
   wherein the obtaining the channel identifier and the sending the media stream are independent of the platform system,
   and said steps of obtaining the channel identifier and sending the media occur during said initialization.

2. The method according to claim 1, wherein before the sending, by the guidance unit, the media stream to the playing unit of the set-top box for playing, the method further comprises:
   initializing, by the guidance unit, the playing unit, and completing the initialization of the playing unit.

3. The method according to claim 1, wherein the obtaining, by the guidance unit, the channel identifier of the channel to be played comprises:
   obtaining, by the guidance unit, a channel identifier of a channel, which is later played by the playing unit, as the channel identifier of the channel to be played; or
   obtaining, by the guidance unit, a channel list, sending the channel list to the playing unit for playing, and obtaining a channel identifier, which is selected by a user according to the channel list, as the channel identifier of the channel to be played.

4. The method according to anyone of claim 1, wherein a signal of the channel to be played comprises an unencrypted signal or an encrypted signal.

5. The method according to anyone of claim 1, wherein the method further comprises:
   after the guidance unit completes the initialization of the platform system, performing, by the playing unit, a television play service through the platform system.

6. A set-top box, comprising a guidance unit and a playing unit, wherein the guidance unit is configured to initialize a platform system, and further configured to: obtain, in a process of initializing of the platform system, a channel identifier of a channel to be played, obtain, by using the channel identifier, a media stream that corresponds to the channel identifier, and send the media stream to the playing unit; and
   the playing unit is configured to receive the media stream sent by the guidance unit and play the media stream,
   and said steps of obtaining the channel identifier and sending the media occur during said initialization.

7. The set-top box according to claim 6, wherein the guidance unit is further configured to initialize the playing unit, and complete the initialization of the playing unit.

8. The set-top box according to claim 6, wherein the obtaining, by the guidance unit, the channel identifier of the channel to be played comprises:
   obtaining, by the guidance unit, a channel identifier of a channel, which is later played by the playing unit, as the channel identifier of the channel to be played; or
   obtaining, by the guidance unit, a channel list, and sending the channel list to the playing unit for playing, and obtaining a channel identifier, which is selected by a user according to the channel list, as the channel identifier of the channel to be played.

9. The set-top box according to claim 6, wherein a signal of the channel to be played comprises an unencrypted signal or an encrypted signal.

10. The set-top box according to claim 6, wherein the playing unit is further configured to perform a television play service through the platform system after the guidance unit completes the initialization of the platform system.

11. A method implemented in a set-top box, comprising:
   initializing, by a guidance unit, a platform system of the set-top box, the set-top box comprising the guidance unit and a playing unit;
   during the initialization of the platform system of the set-top, obtaining, by the guidance unit, a channel identifier of a channel to be played and a media stream that corresponds to the channel identifier; and
   sending, by the guidance unit, the media stream to a playing unit of the set-top box for playing;
   wherein the obtaining the channel identifier and the sending the media stream are independent of the platform system,
   and said steps of obtaining the channel identifier and sending the media occur during said initialization.

* * * * *